US010732055B2

(12) United States Patent
Peng et al.

(10) Patent No.: US 10,732,055 B2
(45) Date of Patent: Aug. 4, 2020

(54) DIELECTROSTRICTIVE SENSORS FOR SHEAR STRESS MEASUREMENT, PROCESS MONITORING, AND QUALITY EXAMINATION OF VISCOELASTIC MATERIALS

(71) Applicant: Northwestern University, Evanston, IL (US)

(72) Inventors: Yiyan Peng, Madison, WI (US); Qian Wang, Mt. Prospect, IL (US)

(73) Assignee: Northwestern University, Evanston, IL (US)

( * ) Notice: Subject to any disclaimer, the term of this patent is extended or adjusted under 35 U.S.C. 154(b) by 2 days.

(21) Appl. No.: 15/335,744

(22) Filed: Oct. 27, 2016

(65) Prior Publication Data

US 2017/0122820 A1    May 4, 2017

Related U.S. Application Data

(60) Provisional application No. 62/248,742, filed on Oct. 30, 2015.

(51) Int. Cl.
  *G01L 1/14*     (2006.01)
  *G01N 11/00*    (2006.01)
  *G01N 11/14*    (2006.01)

(52) U.S. Cl.
  CPC ............ *G01L 1/144* (2013.01); *G01N 11/00* (2013.01); *G01N 11/14* (2013.01); *G01N 2203/0094* (2013.01); *G01N 2203/0617* (2013.01)

(58) Field of Classification Search
  CPC .................................. G01L 1/14; G01B 7/22
  See application file for complete search history.

(56) References Cited

U.S. PATENT DOCUMENTS

| 4,030,347 A | * | 6/1977 | Norris | G01B 7/22 |
| | | | | 361/283.3 |
| 4,086,554 A | * | 4/1978 | Sieder | G01B 7/18 |
| | | | | 338/2 |
| 4,479,392 A | * | 10/1984 | Froeb | G01L 1/14 |
| | | | | 338/47 |
| 4,623,813 A | * | 11/1986 | Naito | G01G 3/13 |
| | | | | 177/210 FP |
| 4,710,550 A | * | 12/1987 | Kranbuehl | B01J 19/0006 |
| | | | | 324/690 |

(Continued)

OTHER PUBLICATIONS

International Search Report, counterpart International Appl. No. PCT/US2016/059084, dated Jan. 6, 2017.

(Continued)

*Primary Examiner* — Tran M. Tran
(74) *Attorney, Agent, or Firm* — Benesch, Friedlander, Coplan & Aronoff LLP (57) ABSTRACT

Interdigitated dielectrostrictive sensors are employed to measure shear stress, and for obtaining strain-dielectric and stress-dielectric coefficients to monitor a process, and examine quality of dielectric materials, including but not limited to polymer, composite, grease, food, biofluids and etc. Each dielectrostrictive sensor includes at least two interdigitated sensors, each having at least two electrodes and a central axis. The central axes are disposed in a common plane and are oriented at different directions.

9 Claims, 6 Drawing Sheets

(56) References Cited

U.S. PATENT DOCUMENTS

| | | | | |
|---|---|---|---|---|
| 4,814,690 A * | 3/1989 | Melcher | G01R 27/2635 | 324/634 |
| 4,964,306 A * | 10/1990 | Jacobsen | G01L 1/005 | 73/763 |
| 5,109,701 A * | 5/1992 | Jacobsen | G01L 1/005 | 73/782 |
| 5,233,213 A * | 8/1993 | Marek | G01P 15/0802 | 257/415 |
| 5,397,911 A * | 3/1995 | Hiyama | G01P 15/124 | 257/415 |
| 5,610,528 A * | 3/1997 | Neely | A61B 5/1071 | 324/660 |
| 5,659,334 A * | 8/1997 | Yaniger | G05G 9/047 | 200/6 R |
| 5,750,904 A * | 5/1998 | Doemens | G01B 7/22 | 73/862.623 |
| 5,790,102 A * | 8/1998 | Nassimi | G06F 3/038 | 345/157 |
| 5,827,980 A * | 10/1998 | Doemens | G01B 7/16 | 73/862.626 |
| 5,828,363 A * | 10/1998 | Yaniger | G05G 9/047 | 345/156 |
| 6,204,656 B1 * | 3/2001 | Cheiky-Zelina | G01R 27/2617 | 324/204 |
| 6,370,961 B1 * | 4/2002 | Trantzas | G01L 5/0085 | 73/824 |
| 6,486,656 B1 | 11/2002 | Schroeder | | |
| 6,532,824 B1 * | 3/2003 | Ueno | G01B 7/22 | 73/780 |
| 6,588,672 B1 | 7/2003 | Usami | | |
| 6,865,960 B2 * | 3/2005 | Doemens | B60N 2/002 | 73/862.626 |
| 6,910,385 B2 | 6/2005 | Shkel | | |
| 6,948,377 B2 * | 9/2005 | Wingett | G01L 5/0047 | 73/795 |
| 7,093,498 B2 * | 8/2006 | Herbert | G01B 7/22 | 73/778 |
| 7,113,179 B2 * | 9/2006 | Baker | G01L 1/205 | 178/18.05 |
| 7,325,605 B2 * | 2/2008 | Fripp | E21B 47/16 | 166/250.01 |
| 7,466,307 B2 * | 12/2008 | Trent, Jr. | G06F 3/03547 | 345/156 |
| 7,502,016 B2 * | 3/2009 | Trent, Jr. | G06F 3/03547 | 345/156 |
| 7,548,073 B2 * | 6/2009 | Mackey | G01D 5/2415 | 324/660 |
| 7,609,253 B2 * | 10/2009 | Trent, Jr. | G06F 3/03547 | 345/156 |
| 7,710,407 B2 * | 5/2010 | Trent, Jr. | G06F 3/03547 | 345/156 |
| 7,726,199 B2 | 6/2010 | Shkel et al. | | |
| 7,854,174 B2 * | 12/2010 | Aebersold | G01L 1/148 | 73/775 |
| 7,984,544 B2 * | 7/2011 | Rosenberg | A63B 71/0605 | 29/595 |
| 8,104,358 B1 * | 1/2012 | Jia | G01L 9/0072 | 73/780 |
| 8,259,076 B2 * | 9/2012 | Trent, Jr. | G06F 3/03547 | 345/156 |
| 8,669,943 B2 * | 3/2014 | Trent, Jr. | G06F 3/03547 | 178/18.01 |
| 8,943,902 B2 * | 2/2015 | Bosscher | G01L 5/226 | 73/862.041 |
| 9,086,267 B2 * | 7/2015 | Ahmad | G01B 7/22 | |
| 9,134,140 B2 * | 9/2015 | Colledani | G01D 5/16 | |
| 9,134,211 B2 * | 9/2015 | Cho | G01N 3/08 | |
| 9,291,586 B2 * | 3/2016 | Neikirk | G01N 27/04 | |
| 9,417,141 B2 * | 8/2016 | ÅBerg | G06F 3/041 | |
| 9,453,773 B2 * | 9/2016 | Choi | G01L 3/106 | |
| 9,509,272 B2 * | 11/2016 | Reisinger | A61N 1/3754 | |
| 9,599,820 B2 * | 3/2017 | Lee | G02B 27/017 | |
| 9,696,223 B2 * | 7/2017 | Lisseman | G01L 1/20 | |
| 9,816,799 B2 * | 11/2017 | Keller | G01B 7/18 | |
| 9,959,004 B2 * | 5/2018 | Lang | G01L 5/0038 | |
| 10,024,740 B2 * | 7/2018 | Rice | G01L 1/2206 | |
| 2005/0156881 A1 | 7/2005 | Trent, Jr. et al. | | |
| 2009/0158856 A1 * | 6/2009 | Harish | G01L 1/142 | 73/780 |
| 2013/0041244 A1 * | 2/2013 | Woias | A61B 5/0215 | 600/381 |
| 2014/0076063 A1 * | 3/2014 | Lisseman | G01L 1/142 | 73/862.68 |
| 2015/0114077 A1 * | 4/2015 | White | G01N 3/24 | 73/1.15 |

OTHER PUBLICATIONS

Written Opinion of the International Search Authority, counterpart International Appl. No. PCT/US2016/059084, dated Jan. 6, 2017.

Yiyan Peng et al., Stress dielectric response in liquid polymers, J. Rheol. 49(1), The Society of Rheology, Inc., Jan./Feb. 2005, pp. 297-311.

Yiyan Peng et al., Rheo-dielectric effect in liquid suspensions, Philosophical Magazine, Jun. 21, 2009, pp. 1473-1487, vol. 89, No. 18.

Yiyan Peng et al., Development of a Rheo-Dielectric Sensor for Online Shear Stress Measurement During the Injection Molding Process, Polymer Engineering and Science (2010), pp. 61-68.

Yiyan Peng et al., A study of the relationship between the rheo-dielectric effect and the elasticity of viscoelastic materials, Journal of Rheology, Mar./Apr. 2011, 301-311.

Yiyan Peng et al., Stress-dielectric relationships in Nutella, Journal of Food Engineering 154 (2015), pp. 25-29.

Yiyan Peng et al., A Tactile Sensor for Ultrasound Imaging Systems, Sensors Journal, IEEE 16(4), Publication Date (Oct. 26, 2010), Issue Date (Feb. 15, 2016) pp. 1044-1053.

* cited by examiner

DIELECTROSTRICTIVE SENSORS FOR SHEAR STRESS MEASUREMENT, PROCESS MONITORING, AND QUALITY EXAMINATION OF VISCOELASTIC MATERIALS

CROSS-REFERENCE TO RELATED APPLICATION

This application claims benefit of U.S. Provisional Patent Application Ser. No. 62/248,742, filed Oct. 30, 2015, the disclosure of which is hereby incorporated by reference in its entirety.

BACKGROUND OF THE INVENTION

The present application is directed to dielectrostrictive sensors and their use in measuring the characteristics of viscoelastic materials Dielectrostriction is a rheo-dielectric phenomenon reflecting the change of dielectric properties of a material under deformation or during flow, and is a fundamental property of any dielectric. It has been found that a linear relationship exists between the change of dielectric constant and stress, which is called the stress-dielectric rule. Also the strain-dielectric and stress-dielectric coefficients have been found sensitive to material structure and composition, particle dispersion, and particle size distribution, degree of elasticity, degradation, temperature, and moisture, etc.

Solid state sensors have been developed that detect deformation based on the dielectrostrictive response of the sample under test. See, e.g. U.S. Pat. No. 7,726,199, which is incorporated herein by reference. As described and illustrated therein, a dielectrostrictive sensor has a planar configuration with interdigitated electrodes deposited on a non-conductive substrate. During a use, the material being tested is adjacent to electrodes, but does not necessarily touch them. The deformation of the test material changes the dielectric properties of the material, which, therefore, changes the sensor capacitance.

Once the stress-dielectric coefficient of the test material is determined, the stress can be obtained through the change of dielectric constant, and therefore, through the change of the sensor's capacitance based on the stress-dielectric rule. On the other hand, once the strain or stress is known, the strain-dielectric coefficients, or the stress-dielectric coefficients, can be obtained, which can be used for process monitoring and material quality examination.

Based on the stress-dielectric rule, a linear relationship exists between the change of a dielectric constant and stress a and can be expressed as, $\varepsilon_{ij}=\varepsilon\delta_{ij}+\lambda_1\sigma_{ij}+\lambda_2\sigma_{ll}\delta_{ij}$, (1)

where $\varepsilon$ is the dielectric constant of the material before deformation, and $\lambda_1$ and $\lambda_2$ are stress-dielectric coefficients, and $\delta_{ij}$ the Kronecker delta.

For a viscoelastic material when the change of dielectric constant is small, the change of the dielectric constant can also be expressed in terms of strain u, as, $\varepsilon_{ij}=\varepsilon\delta_{ij}+\alpha_1 u_{ij}+\alpha_2 u_{ll}\delta_{ij}$, (2)

and $\alpha_1$ and $\alpha_2$ are strain-dielectric coefficients.

Figure 1A:
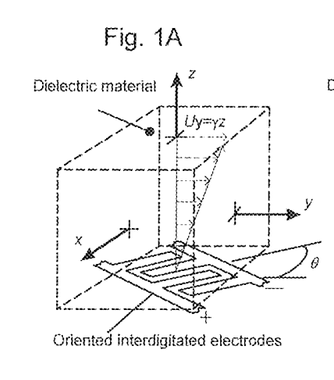
FIG. 1A shows a dielectric material adjacent to electrodes that is under a shear deformation or experiences a shear flow, $u_{yz}=yz$, in which inter-digitated electrodes are located in the xy-plane and form an angle, $\theta$, with the y-axis.
Figure 1B:
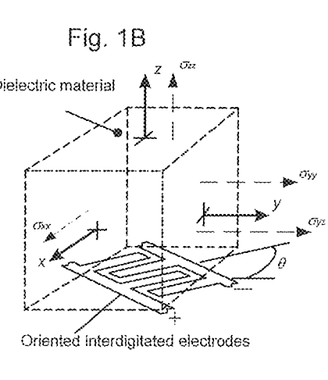
FIG. 1B shows a dielectric material that is subjected to shear stress $\sigma_{yz}$ and might also be subjected to normal stresses $\sigma_{yz}$, $\sigma_{xx}$, $\sigma_{yy}$ and $\sigma_{zz}$, if the material is viscoelastic.
Figure 1C:
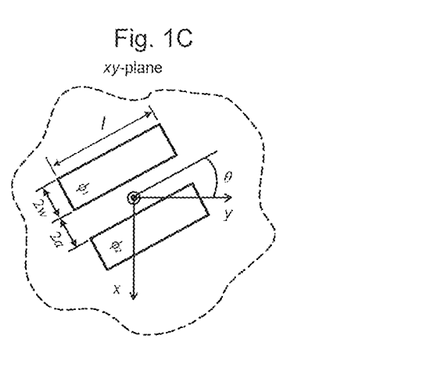

With reference to FIGS. 1A, 1B and 1C, a dielectrostrictive sensor is formed by inter-digitated electrodes having equal width, W=2w, and being separated by a distance, A=2a, which is attached to an originally isotropic material with dielectric constant $\varepsilon$. Both the thickness of the dielectric material, h (not shown), and the length of the electrode, l, are much larger than the electrode width and the separation (h,l>>W, A). The electrodes in FIG. 1 are located in the xy-plane and form an angle, $\theta$, with respect to the y axis. The capacitance, $C_{ij}$ of such a planar sensor is, $$C_\theta = C^0(\varepsilon_{effective} + \varepsilon_s),$$ (3)

$$C^0 = \frac{\varepsilon_0 L}{\pi}\ln\left(1+\frac{w}{a}\right),$$

and $$\varepsilon_{effective} = \left[\begin{array}{c}(\varepsilon_{xx}\varepsilon_{zz}-\varepsilon_{xz}^2)\cos^2\theta + (\varepsilon_{yy}\varepsilon_{zz}-\varepsilon_{yz}^2)\sin^2\theta + \\ 2(\varepsilon_{xy}\varepsilon_{zz}-\varepsilon_{xz}\varepsilon_{yz})\cos\theta\sin\theta\end{array}\right]^{1/2},$$

where $\varepsilon_s$ is the dielectric constant of the sensor substrate and $\varepsilon_{effective}$ is the effective dielectric constant of the material on the top. For an isotropic material, $\varepsilon_{effective}=\varepsilon$, therefore, the capacitance of the sensor before deformation is $C_\theta=C^0(\varepsilon+\varepsilon_s)$. L is the total length of all electrode strips, and $2C^0$ represents the capacitance of the electrodes in the free space. When a=w, $C^0$ is estimated to be $$\frac{\varepsilon_0 L}{\pi}\ln\left(1+\frac{w}{a}\right)$$

from Eq. (3). The value $C^0$ also can be directly measured for any given electrode pattern.

With reference to FIG. 1A, a dielectric material adjacent to electrodes is under a shear deformation or experiences a shear flow, $u_{yz}$=yz, inter-digitated electrodes are located in the xy-plane and form an angle, $\theta$, with the y-axis. In FIG. 1B, the dielectric material is subjected to shear stress $\sigma_{yz}$ and might also be subjected to normal stresses $\sigma_{yz}$, $\sigma_{xx}$, $\sigma_{yy}$ and $\sigma_{zz}$, if the material is viscoelastic.

When the dielectric material is under a deformation, or experiences a flow, it becomes anisotropic and its dielectric constant becomes a second rank tensor. As an example, if the dielectric material is under a shear deformation or experiences shear flow, $U_y$=yz, as shown in FIG. 1A, the non-zero strain components to which it is subjected would be $$u_{yz} = \frac{\gamma}{2},$$

and $$u_{zz} = \frac{\gamma^2}{2},$$

and the non-zero stress components would be shear stress $\sigma_{yz}$, and there might also be normal stresses, $\sigma_{xx}$, $\sigma_{yy}$, and $\sigma_{zz}$, if the material is a viscoelastic, as shown in FIG. 1B.

According to the stress-dielectric relationship in Eq. (1), the dielectric constant tensor can be expressed in terms of stress, $$\varepsilon = \begin{bmatrix} \varepsilon+\lambda_1\sigma_{xx}+\lambda_2\sigma_{ll} & 0 & 0 \\ 0 & \varepsilon+\lambda_1\sigma_{yy}+\lambda_2\sigma_{ll} & \lambda_1\sigma_{yz} \\ 0 & \lambda_1\sigma_{yz} & \varepsilon+\lambda_1\sigma_{zz}+\lambda_2\sigma_{ll} \end{bmatrix},$$ (4)

where $\sigma_{II}=\sigma_{xx}+\sigma_{yy}+\sigma_{zz}$. Substituting the components of the dielectric constant tensor into Eq. (3) yields the expression for the capacitance of the planar dielectrostrictive sensor in terms of the stress after deformation, $$C_\theta = C^0 \left( \frac{\varepsilon + \frac{1}{2}\begin{pmatrix}\lambda_1\sigma_{xx}\cos^2\theta + \\ \lambda_1\sigma_{yy}\sin^2\theta + \\ \lambda_1\sigma_{zz}+2\lambda_2\sigma_{II}\end{pmatrix} + \begin{pmatrix}\lambda_1\sigma_{xx}\cos^2\theta + \\ \lambda_1\sigma_{yy}\sin^2\theta + \\ \lambda_2\sigma_{II}\end{pmatrix}(\lambda_1\sigma_{zz}+\lambda_2\sigma_{II})-\lambda_1^2\sigma_{yz}^2\sin^2\theta}{2\varepsilon} + \varepsilon_s \right). \quad (5)$$

According to the strain-dielectric relationship in Eq. (2), the dielectric constant tensor can be expressed in terms of strain, $$\varepsilon = \begin{bmatrix} \varepsilon + \frac{\gamma^2}{2}\alpha_2 & 0 & 0 \\ 0 & \varepsilon + \frac{\gamma^2}{2}\alpha_2 & \frac{\gamma}{2}\alpha_1 \\ 0 & \frac{\gamma}{2}\alpha_1 & \varepsilon + \frac{\gamma^2}{2}(\alpha_1+\alpha_2) \end{bmatrix} \quad (6)$$

Substituting the components of the above dielectric constant tensor into Eq. (3) yields the capacitance of the planar dielectrostrictive sensor in terms of the strain after deformation, $$C_\theta = \frac{C^0}{2}\left(\varepsilon + \frac{2\varepsilon\alpha_1 + 4\varepsilon\alpha_2 - \alpha_1^2\sin^2\theta}{8\varepsilon}\gamma^2 + \varepsilon_s\right). \quad (7)$$

According to Eqs. (5) and (7), by extracting signals from two differently oriented sensors ($\theta_1$ and $\theta_2$ with respect to the y-direction), one can obtain the capacitance difference in terms of strain, $$C_{\theta 1} - C_{\theta 2} = \frac{C^0}{16\varepsilon}\alpha_1^2\gamma^2(\cos 2\theta_1 - \cos 2\theta_2), \quad (8)$$

or in terms of stress, $$C_{\theta 1} - C_{\theta 2} = \quad (9)$$
$$\frac{C^0}{4\varepsilon}[(\sigma_{xx}-\sigma_{yy})(\varepsilon + \sigma_{zz}\lambda_1 + \sigma_{II}\lambda_2) + \sigma_{yz}^2\lambda_1]\lambda_1(\cos 2\theta_1 - \cos 2\theta_2).$$

If the normal stress contribution, $\sigma_{xx}-\sigma_{yy}$, in Eq. (9), does not exist, or is much less than the shear stress contribution, $\sigma_{yz}^2\lambda_1$, it can therefore be neglected, then Eq. (9) can reduce to $$C_{\theta 1} - C_{\theta 2} = \frac{C^0}{4\varepsilon}\sigma_{yz}^2\lambda_1^2(\cos 2\theta_1 - \cos 2\theta_2). \quad (10)$$

For Material showing a viscoplastic behavior, deformed or flow sheared above yield stress $\sigma_Y$, the capacitance difference between the two differently oriented sensors are, $$C_{\theta 1} - C_{\theta 2} = \frac{C^0}{4\varepsilon}(\sigma_{yz}-\sigma_Y)^2\lambda_1^2(\cos 2\theta_1 - \cos 2\theta_2). \quad (11)$$

Figure 2:
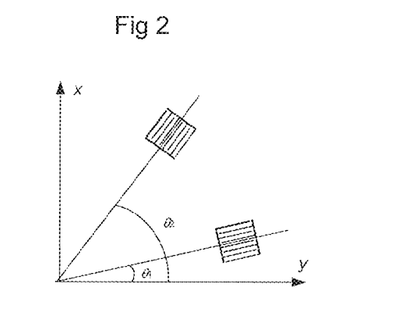
FIG. 2 shows a planar sensor rosette with two sensors oriented at different directions, $\theta_1$, and $\theta_2$ with the y-axis.

To measure the strain-dielectric coefficient, $\alpha_1$, and the stress-dielectric coefficient, $\lambda_1$, it is known to use a planar sensor rosette with at least two differently orientated sensors that are oriented at different directions, $\theta_1$, and $\theta_2$ with the y-axis, as shown in FIG. 2.

When the original material dielectric constant, $\varepsilon$, orientation angles, $\theta_1$, and $\theta_2$, engineering strain, $\gamma$, shear stress, $\sigma_{yz}$, are known, the strain-dielectric coefficient, $\alpha_1$, and the stress-dielectric coefficient, $\lambda_1$, can be determined by obtaining the capacitance difference, $C_{\theta 1}$-$C_{\theta 2}$.

If the normal stress contribution cannot be neglected, detection of the first stress-dielectric coefficient, $\lambda_1$, requires the information of the first and second normal stress differences, $-(N_1+N_2)=\sigma_{xx}-\sigma_{yy}$, and dielectric constant component, $\varepsilon_{zz}=\varepsilon+\sigma_{zz}\lambda_1+\sigma_{II}\lambda_2$. The values of the first and second normal stress differences can be measured with a rheometer with cone-plate and parallel-plate configurations. The dielectric constant component, $\varepsilon_{zz}$, could be obtained through measuring the capacitance of two metal sheets attached to the side surfaces of the inner and outer cylinders of the rheometer with a co-axial cylindrical system during the shear flow. When the gap between the inner and outer cylinders is much smaller than their radii, approximation can be assumed, and the two metal sheets with the testing material in between can be treated as a parallel-plate capacitor.

By way of the present application, a sensor rosette is provided that allows the measurement of shear stress in a viscoelastic material and methods are provided for measuring the compositions and properties or detecting changes in compositions and properties of viscoelastic substances having known dielectric constants before deformation.

SUMMARY

In a first aspect of the invention, a sensor for measuring shear stress in a material having dielectric properties is provided that comprises three or more dielectrostrictive sensors, each having a plurality of interdigitated electrodes deposited on a non-conductive substrate aligned on a central axis, the three or more sensors forming a generally planar rosette with the central axis of each sensor being oriented in non-parallel relation and at a known angle to one another In a related aspect, the sensor further comprises a voltage source electrically-connected to the electrodes for applying a voltage thereto; and a circuit for detecting the capacitance of the electrodes in response to an applied voltage. The circuit may either detect the capacitance difference between any of two pairs of the sensors, or detect a variation in the capacitance of each sensor due to deformation or flow of the substance and calculates a difference in the capacitance variation of any two sensors.

In a second aspect of the invention, a method for measuring the deformation of a viscoelastic substance having a known dielectric constant before deformation and a known stress-dielectric coefficient are provided. The method comprises providing a sensor for measuring shear stress in a material having dielectric properties comprising three or more dielectrostrictive sensors, each having a plurality of interdigitated electrodes deposited on a non-conductive substrate aligned on a central axis, the three or more sensors forming a generally planar rosette with the central axis of each sensor being oriented in non-parallel relation and at a known angle to one another, the sensor being mounted on a surface of a structure so as to be subjected to flowing or deformed viscoelastic substance; applying a voltage to the sensors; measuring the capacitance difference between any two pairs of the sensors, or a variation in the capacitance of each sensor due to deformation or flow of the substance and calculates a difference in the capacitance variation of any two sensors; and correlating the capacitance difference to the dielectric constant of the substance under deformation or during flow to quantify the shear stress.

In a third aspect of the invention, a method for measuring the deformation with the known direction of deformation or flow of a viscoelastic substance having a known dielectric constant before deformation and known stress-dielectric coefficient. The method comprises providing a first and second dielectrostrictive sensor, each having a plurality of interdigitated electrodes deposited on a non-conductive substrate aligned on a central axis, the sensors being mounted on a surface of a structure so as to be subjected to a flowing or deformed viscoelastic substance with the central axis of each sensor being oriented in non-parallel relation and at a known angle to one another; applying a voltage to the sensors; measuring the capacitance difference between the first and second dielectrostrictive sensor; or a variation in the capacitance of each sensor due to deformation or flow of the substance and calculates a difference in the capacitance variation of these two sensors, and correlating the capacitance difference to the to quantify the shear stress.

In a fourth aspect of the invention, a method for measuring the strain-dielectric coefficients or stress-dielectric coefficients of a viscoelastic substance having a known dielectric constant before deformation, and known strain or stress field is provided. The method comprises providing two dielectrostrictive sensors, each having a plurality of interdigitated electrodes deposited on a non-conductive substrate aligned on a central axis, the sensors being mounted on a surface of a structure so as to be subjected to flowing or deformed viscoelastic substance with the central axis of each sensor being oriented in non-parallel relation and at a known angle to one another; applying a voltage to the sensors; either measuring the capacitance difference between these two sensors, or measuring the capacitance variation of each sensor due to deformation; calculating the difference in the capacitance variation of any two sensors; and correlating the capacitance difference to the dielectric constant of the substance under deformation or during flow, whose dielectric constant before deformation is known, to obtain the strain-dielectric coefficients or stress-dielectric coefficients.

BRIEF DESCRIPTION OF THE DRAWINGS

FIG. 1C shows a sensor configuration in which each electrode strip has a width, 2w, a length, l, and is separated from each other by 2a.

DETAILED DESCRIPTION

The embodiments disclosed herein are for the purpose of providing an exemplary description of the present subject matter. They are, however, only exemplary, and the present subject matter may be embodied in various forms. Therefore, specific details disclosed herein are not to be interpreted as limiting the subject matter as defined in the accompanying claims.

In a first aspect of the application, a dielectrostrictive sensor is provided that permits measuring shear stress. To measure shear stress, at least three differently orientated sensors are required, as shown in FIG. 3.

Figure 3A:
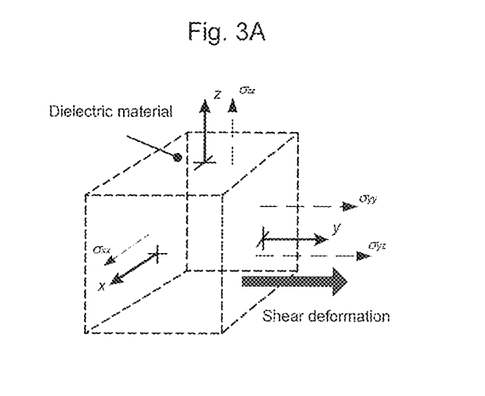
FIG. 3A shows a dielectric material being measured is under a shear deformation, or experiencing a shear flow along the y direction.
Figure 3B:
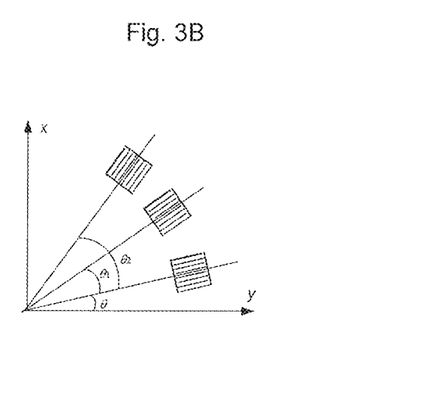
FIG. 3B shows a planar sensor rosette with three sensors oriented at different directions.

In FIG. 3A the dielectric material being measured is under a shear deformation, or experiencing a shear flow along the y direction. A planar sensor rosette with three sensors oriented at different directions, as shown in FIG. 3B, may be utilized for such purposes.

For example, if the dielectric material being measured is under deformation or experiencing a shear flow along the y-direction. If the normal stress distribution does not exist or can be neglected, Eq. (10) leads to the capacitance difference between sensors as follows, $$C_{\theta+\theta_1} - C_\theta = \frac{C^0}{4\varepsilon}\sigma_{yz}^2\lambda_1^2(\cos2\theta\cos2\theta_1 - \sin2\theta\sin2\theta_1 - \cos2\theta), \quad (12)$$

-continued $$C_{\theta+\theta2} - C_\theta = \frac{C^0}{4\varepsilon}\sigma_{yz}^2\lambda_1^2(\cos2\theta\cos2\theta_2 - \sin2\theta\sin2\theta_2 - \cos2\theta).$$

If the material shows viscoplastic behavior (i.e., the material flows only above its yield stress), then the capacitance difference between sensors is, $$C_{\theta+\theta1} - C_\theta = \qquad (13)$$
$$\frac{C^0}{4\varepsilon}(\sigma_{yz} - \sigma_Y)^2\lambda_1^2(\cos2\theta\cos2\theta_1 - \sin2\theta\sin2\theta_1 - \cos2\theta),$$
$$C_{\theta+\theta2} - C_\theta = \frac{C^0}{4\varepsilon}(\sigma_{yz} - \sigma_Y)^2\lambda_1^2(\cos2\theta\cos2\theta_2 - \sin2\theta\sin2\theta_2 - \cos2\theta).$$

When the angle differences, $\theta_1$ and $\theta_2$, between any pair of the sensors are known, the magnitude, $\sigma_{yz}$, and the direction of the shear stress reflected by the orientation angle, $\theta$, to y-direction, can be determined by obtaining the capacitance differences between any two pairs of the sensors.

If the normal stress contribution cannot be neglected, the capacitance differences between any pair of the sensors would be $$C_{\theta+\theta1} - C_\theta = \frac{C^0}{4\varepsilon}[(\sigma_{xx} - \sigma_{yy})(\varepsilon + \sigma_{zz}\lambda_1 + \sigma_{II}\lambda_2) + \sigma_{yz}^2\lambda_1] \qquad (14)$$
$$\lambda_1(\cos2\theta\cos2\theta_1 - \sin2\theta\sin2\theta_1 - \cos2\theta),$$
$$C_{\theta+\theta2} - C_\theta = \frac{C^0}{4\varepsilon}[(\sigma_{xx} - \sigma_{yy})(\varepsilon + \sigma_{zz}\lambda_1 + \sigma_{II}\lambda_2) + \sigma_{yz}^2\lambda_1]$$
$$\lambda_1(\cos2\theta\cos2\theta_2 - \sin2\theta\sin2\theta_2 - \cos2\theta).$$

In order to obtain both direction and magnitude of shear stress $\sigma_{yz}$, beside knowing the relationship between normal stress difference $\sigma_{xx}-\sigma_{yy}$ and shear stress, the relationship between dielectric constant component $\varepsilon_{zz}$, and shear stress at various shear rates needs to be obtained by using the method described above.

A system utilizing the sensors and their methods of use may include a controller taking the form of one or more electrical components or circuits. For example the controller may comprise a processor and an associated memory, with the processor being programmed or otherwise configured to carry out or control any of the actions and computations described herein.

In a second aspect of the application, it is contemplated that the subject matter of the present disclosure may have utility for measuring the shear stress of liquids, gels, semi-solids, and solid dielectrics, as used in various applications and environments and may be implemented off-line, on-line, and in-situ for the measurement of the shear stress of viscoelastic materials including, but not limited to, polymers, composites, adhesives, greases, food, biofluids, etc. The technology may also be used to obtain strain-dielectric and stress-dielectric coefficients, which can be used to monitor process whose variation is caused by change in stress, material structure, and composition, degree of elasticity, temperature, moisture, and degradation, etc.) and to examine the material's quality. Such measurements can provide real-time, in-situ information for process monitoring and material quality examination, to save time and expense.

EXAMPLE 1

A study of the dielectrostriction effect in three types of dark chocolate in oscillatory shear flow has been investigated. The relationships between the dielectrostrictive response and rheological properties were determined, and the dielectrostricive responses of three types of chocolate compared. Composition and rheological properties such as viscosity would directly affect the taste and processing characteristics of various stages during chocolate production such as mixing, pumping, refining, conching, tempering, molding, and enrobing, which entail different shear rates, and thus the quality of the final product. Knowing the variation in composition and the rheological properties of chocolate without having to sample and measure these properties in a separate operation allows for a quick adjustment, therefore saves time and cost.

For this study, dielectric constant of a deformed isotropic material is described by a second order tensor, $\varepsilon_{ij}$, which can be approximated as a linear function of strain tensor, $\mu_{ij}$, $$\Delta\varepsilon_{ij}=(\varepsilon_{ij}-\varepsilon\delta_{ij})=\alpha_1 u_{ij}+\alpha_2 u_{ll}\delta_{ij}. \qquad (15)$$

Small variations of dielectric properties with deformation are required to justify the assumption of linearity of the strain-dielectric relationship in Eq. (15), namely, $$\|\alpha_1 u_{ij}\|<<\varepsilon, \text{ and } |\alpha_2 u_{ll}|<<\varepsilon. \qquad (16)$$

For Eq. (16), the double line bracket indicates the magnitude of the components in the tensor, while the single line bracket indicates the magnitude of the scalar. In Eq. (15) and (16), $\varepsilon$ and $\varepsilon_{ij}$ are the dielectric constants of the material before and after deformations, $\alpha_1$ and $\alpha_2$ are strain-dielectric coefficients (also called electrostriction parameters), which are material parameters. While the first coefficient $\alpha_1$ is associated with the degree of anisotropy of the dielectric material, the second coefficient, $\alpha_2$, is responsible for the change in the number density of the dipoles. Since dielectrostriction phenomenon is determined by both single distribution function (density change) and pair distribution function (relative position changes) of the dipoles, it is sensitive to material microstructure.

As stated above, a linear relationship exists between the change in dielectric constant and stress known as the stress-dielectric rate. This linear stress-dielectric relationship has a similar form to the well-known stress-optical rule commonly used in rheological studies, and can be expressed as, $$\Delta\varepsilon_{ij}(=\varepsilon_{ij}-\varepsilon\delta_{ij})=\lambda_1\sigma_{ij}+\lambda_2\sigma_{ll}\delta_{ij}, \qquad (17)$$

where $\lambda_1$ and $\lambda_2$ are stress-dielectric coefficients.

The similarity between the stress-optical rule and the stress-dielectric rule is expected since birefringence and dielectrostriction have similar physical bases: both phenomena involve polarization mechanisms and the change in material microstructure. However, birefringence only involves electronic polarization, and therefore only can work with transparent materials. All polarization mechanisms are utilized in dielectrostriction, which makes dielectrostriction measurement applicable to both transparent and opaque materials and able to be conducted over a wide frequency range of electromagnetic field.

The planar dielectrostrictive sensor used for this dielectrostriction study has inter-digitated electrodes deposited on a non-conductive substrate (FIGS. 1A and 1B).

The dielectrostrictive sensor is formed by inter-digitated electrodes having equal width, W=2w, and being separated by a distance, A=2a, which is attached to a dielectric material, as shown in FIG. 1C. Both the thickness of the dielectric material, h, (which is not shown in FIG. 1), and the length of the electrode, l, are much larger than the electrode width and separation (h, l>>W, A). The electrodes in FIGS. 1A and 1B are located in the xy-plane and form an angle, θ, with respect to the y-axis. The capacitance, $C_\theta$, of such a planar sensor is $$C_\theta = C_0(\varepsilon_{\text{effective}} + \varepsilon_s), \text{ and}$$

$$\varepsilon_{\text{effective}} = [(\varepsilon_{xx}\varepsilon_{zz} - \varepsilon_{xz}^2)\cos^2\theta + (\varepsilon_{yy}\varepsilon_{zz} - \varepsilon_{yz}^2)\sin^2\theta + 2(\varepsilon_{xy}\varepsilon_{zz} - \varepsilon_{xz}\varepsilon_{yz})\cos\theta\sin\theta]^{1/2}, \quad (18)$$

where $\varepsilon_s$ is the dielectric constant of the sensor substrate and $\varepsilon_{\text{effective}}$ is the effective dielectric constant of the material on the top. For an isotropic material, $\varepsilon_{\text{effective}} = \varepsilon$, therefore, the capacitance of the sensor before deformation is $C_\theta = C_0(\varepsilon + \varepsilon_s)$. Parameter L is the combined length of all electrode strips, and $2C_0$ represents the capacitance of the electrodes in free space. The value of $C_0$ can be obtained experimentally or estimated as $C_0 = \varepsilon_0 L \ln$ $$\left(1 + \frac{w}{a}\right)/\pi.$$

If a dielectric material under a shear deformation, $U_y = \gamma z$, as shown in FIG. 1A, the strain and stress tensors can be expressed respectively as, $$u = \begin{bmatrix} 0 & 0 & 0 \\ 0 & 0 & \gamma/2 \\ 0 & \gamma/2 & \gamma^2/2 \end{bmatrix} \text{ and } \sigma = \begin{bmatrix} \sigma_{xx} & 0 & 0 \\ 0 & \sigma_{yy} & \sigma_{yz} \\ 0 & \sigma_{yz} & \sigma_{zz} \end{bmatrix}. \quad (19)$$

Substituting the above strain or stress components into strain-dielectric (as in Eq. (15)) and stress-dielectric (as in Eq. (17)) relationships, and then into sensor capacitance expression (as in Eq. (18)), the capacitance of an arbitrary oriented sensor can be expressed in terms of strain, $$C_\theta = C_0 \left( \varepsilon + \frac{2\varepsilon\alpha_1 + 4\varepsilon\alpha_2 - \alpha_1^2 \sin^2\theta}{8\varepsilon} \gamma^2 + \frac{\alpha_1\alpha_2 + \alpha_2^2}{8\varepsilon} \gamma^4 + \varepsilon_s \right). \quad (20)$$

If the deformation is small, the higher order item ($\gamma^4$) can be neglected, Eq. (20) reduces to $$C_\theta = C_0 \left( \varepsilon + \frac{2\varepsilon\alpha_1 + 4\varepsilon\alpha_2 - \alpha_1^2 \sin^2\theta}{8\varepsilon} \gamma^2 + \varepsilon_s \right), \quad (21)$$

or in terms of stress, $$C_\theta = C_0 \left( \begin{array}{c} \varepsilon + \frac{1}{2}(\lambda_1\sigma_{xx}\cos^2\theta + \lambda_1\sigma_{yy}\sin^2\theta + \lambda_1\sigma_{zz} + 2\lambda_2\sigma_{ll}) + \\ (\lambda_1\sigma_{xx}\cos^2\theta + \lambda_1\sigma_{yy}\sin^2\theta + \lambda_2\sigma_{ll})(\lambda_1\sigma_{zz} + \lambda_2\sigma_{ll}) - \\ \dfrac{\lambda_1^2\sigma_{yz}^2\sin^2\theta}{2\varepsilon} + \varepsilon_s \end{array} \right). \quad (22)$$

From Eq. (21), it can be seen that the two strain-dielectric coefficients, $\alpha_1$ and $\alpha_2$, can be decoupled by using two differently oriented sensors. Under small deformations when the normal stress contribution is much less than shear stress contribution, two stress-dielectric coefficients, $\lambda_1$ and $\lambda_2$, also can be decoupled by extracting signals from two differently oriented sensors. If these two sensor are mutually perpendicularly oriented to each other, their capacitance difference would be, $$C_\theta - C_{\theta+\pi/2} = C_0 \frac{\alpha_1^2 \cos 2\theta}{8\varepsilon} \gamma^2, \quad (23)$$

in terms of strain, or $$C_\theta - C_{\theta+\pi/2} = C_0 \frac{\lambda_1^2 \cos 2\theta}{2\varepsilon} \sigma_{yz}^2, \quad (24)$$

in terms of stress.

For this study, three types of dark chocolate were chosen (Ghirardelli Chocolate Company) with 60%, 72%, and 86% cacao contents were chosen for study. The main intergradient of these three types of chocolate printed in their package is listed in Table 1. The dielectric constants of these three types of chocolate were measured at a frequency of 10 kHz by Agilent E4980A LCR meter, and are listed in Table 2.

TABLE 1

The main intergradient of three types of dark chocolate.

| Cacao content (%) | Fat (g) | Carbohydrate | | Protein (g) | Calcium (%) | Iron (%) |
| --- | --- | --- | --- | --- | --- | --- |
| | | Fiber (g) | Sugars (g) | | | |
| 60 | 14 | 3 | 14 | 2 | 2 | 15 |
| 72 | 17 | 4 | 10 | 2 | 2 | 15 |
| 86 | 25 | 5 | 5 | 3 | 2 | 25 |

Figure 4:
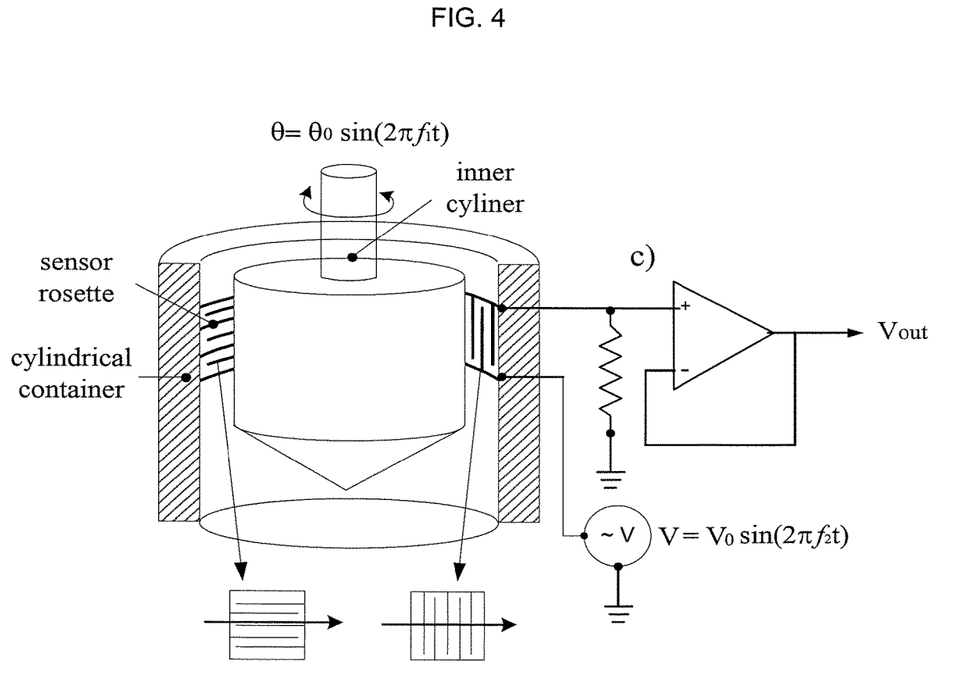
FIG. 4 shows a rheometer that produces oscillatory shear flow between concentric cylinders, with two planar sensors being attached to the fixed cylinder parallel-to-flow and perpendicular-to-flow.

The rheological properties of the chocolate sample were characterized on AR 2000 rheometer (TA Instruments) as shown schematically in FIG. 4, which has a standard concentric cylinder temperature control system including a DIN cup with inner radius of 15 mm and a bob with radius of 14 mm. The rheometer of FIG. 4 produces oscillatory shear flow between concentric cylinders ($\theta_0 = \gamma_0(R_2-R_1)/R_1$). The immersion (4) 70 depth of the bob was set to be 42 mm during tests. For dielectrostriction measurements, a sensor rosette was attached to the inner surface of the DIN cup with the electrodes of one sensor perpendicular to the flow direction and the electrodes of the other sensor parallel to the flow direction. The width and distance between the two adjacent electrodes was 2w=2a=0.3 mm. The circuit of FIG. 4 was used to register small variations in the capacitance of the sensor caused by the flow. An excitation voltage having an amplitude of 7.07 V and a frequency of 0.2 Hz was applied, and a large resistance R (~1 GΩ) ensured that the charge Q, on the sensor electrodes remained constant. By neglecting the effect of curvature of the sensor rosette mounted on the inner surface of the DIN cup, the variation of voltage, ΔV, across the electrodes is related to the change of capacitance, ΔC, by, $$\frac{\Delta V}{V^0} = -\frac{\Delta C}{C} = -\frac{\Delta\varepsilon}{\varepsilon+\varepsilon_S}, \quad (25)$$

where $V^0$ is the voltage between the electrodes before deformation and Δε is the variation of dielectric constant with deformation. $\varepsilon_s$ represents dielectric constant of the electrode substrate, which is estimated to be 47.73.

The voltage outputs due to the dielectrostriction response measured by the electrodes parallel to the flow direction, $\theta=0°$, and perpendicular to the flow direction, $\theta=90°$, in terms of strain are $$\Delta V_\| = -\frac{2\varepsilon\alpha_1 + 4\varepsilon\alpha_2}{8\varepsilon(\varepsilon+\varepsilon_s)}\gamma^2 V^0, \text{ and} \quad (26)$$

$$\Delta V_\perp = -\frac{2\varepsilon\alpha_1 + 4\varepsilon\alpha_2 - \alpha_1^2}{8\varepsilon(\varepsilon+\varepsilon_s)}\gamma^2 V^0.$$

These equations show that the variations of voltage due to a shear flow are quadratic with the shear strain, $\gamma=\gamma_0 \sin(2\pi f)t$. Therefore, the dielectrostriction response is measured at double the frequency of the mechanical oscillations, 2f.

The three types of dark chocolate were measured during oscillatory shear flow in time sweep mode. The oscillation frequency was set to be 10 Hz, and the shear strain amplitude varied from 15% to 30% with an increment of 5% (the corresponding shear rate is from 9.42 s$^{-1}$ to 18.85 s$^{-1}$). All tests were carried out at 40° C. with a 10-minute soak time and a pre-shear for 10 minutes at 10 Hz and 30% strain amplitude. The pre-shear step was applied to make sure that no agglomerations existed in the chocolate samples and to account for the effects of thixotropy in molten chocolate.

Figure 5A:
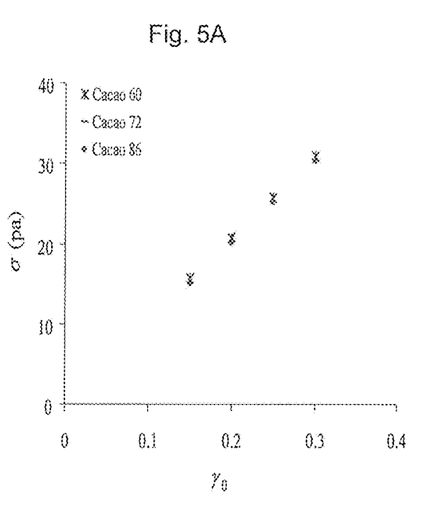
FIGS. 5A and 5B show the stress-strain, and stress-shear rate profiles of three types of dark chocolate measured at an oscillatory frequency of 10 Hz and a strain amplitude ranging from 15 to 30%.
Figure 5B:
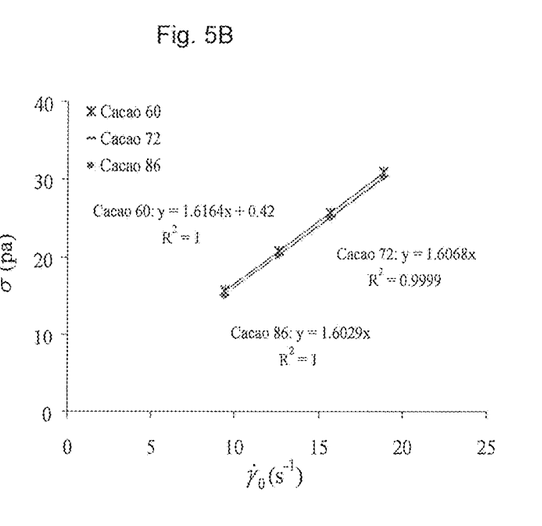

During the tests, the voltage variations, $\Delta V_\|$ and $\Delta V_\perp$, from the parallel-to-flow and the perpendicular-to-flow sensors were digitally recorded at a sampling rate of 100 kHz. The output signal was obtained through a fast Fourier transform of the measured data. The strain and the corresponding stress were recorded by the rheometer simultaneously with the voltage outputs. Three samples of each type of chocolate were tested. Each sample was conducted in duplicate, With respect to the rheological responses, FIGS. 5A and 5B show the stress-strain, and stress-shear rate profiles of the three types of dark chocolate in the oscillatory shear flow at an oscillatory frequency of 10 Hz and a strain amplitude ranging from 15 to 30%. A yield stress at 0.42 Pa has been found for the chocolate with 60% cacao content, and not detectable for chocolate with 72% and 86%. The yield stress, $\sigma_y$, and viscosity, $\eta$, of these three types of chocolate calculated on the Bingham model for non-Newtonian fluids, are listed in Table 2.

Figure 6A:
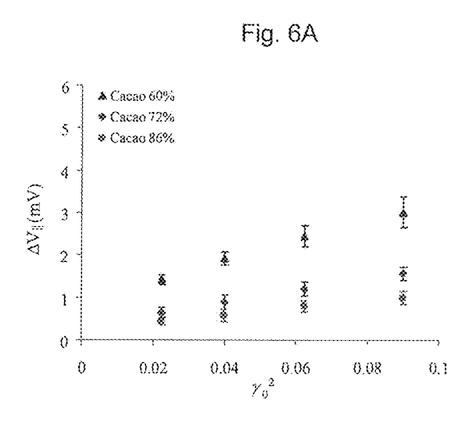
FIGS. 6A and 6B show the strain-dielectric relationships for the output voltage, $\Delta V_\parallel$ obtained by the parallel-to-flow sensor (FIG. 6A), and for the voltage, $\Delta V_\perp$, obtained by the perpendicular-to-flow sensor (FIG. 6B) of three types of dark chocolate presented in terms of the square of strain amplitude, $\gamma_0^2$.
Figure 6B:
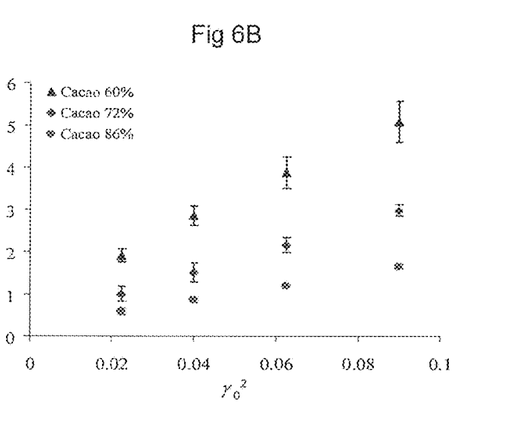

With respect to the dielectrostrictive responses, FIGS. 6A and 6B show the output voltage, $\Delta V_\|$, obtained by the parallel-to-flow sensor, and $\Delta V_\perp$, obtained by the perpendicular-to-flow sensor in terms of the square of strain amplitude, $\gamma_0^2$, respectively. The value of each plotted point represents the mean of total 6 measurements on 3 samples. The error bars presents ±SD.

Figure 7A:
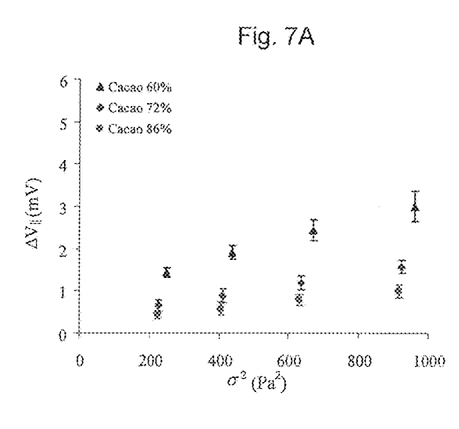
FIGS. 7A and 7B show the stress-dielectric relationships for the output voltage, $\Delta V_\parallel$, obtained by the parallel-to-flow sensor (FIG. 7A), and for the voltage, $\Delta V_\perp$, obtained by the perpendicular-to-flow sensor (FIG. 7B) of three types of dark chocolate presented in terms of the square of shear stress, $\sigma^2$.
Figure 7B:
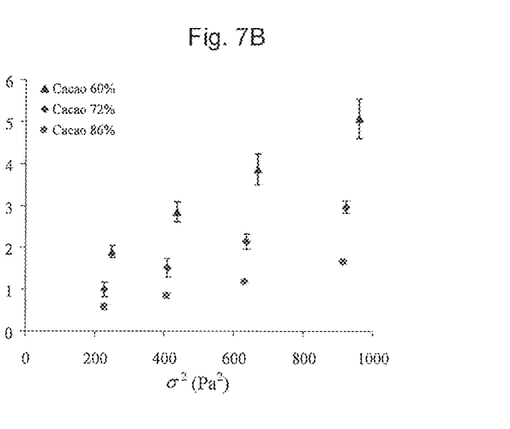
Figure 8:
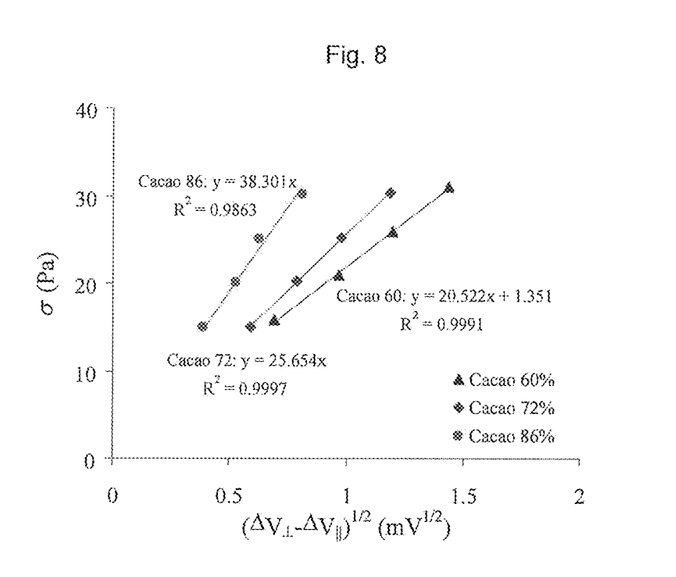
FIG. 8 shows the extracted signal, $\Delta V_\perp - \Delta V_\parallel$, from parallel-to-flow and perpendicular-to-flow sensors is presented in terms of the shear stress, $\sigma$.

The dielectrostrictive signals in terms of the square of the corresponding shear stress, $\sigma^2$, for the perpendicular-to-flow and the parallel-to-flow sensors are presented in FIGS. 7A and 7B, respectively. The square of the extracted signals from the above two sensors in terms of the shear stress, $\sigma$, is presented in FIG. 8B. The value of each plotted point represents the mean of total 6 measurements on 3 samples. The error bars presents ±SD. From FIG. 8, it can be seen that the square of the extracted dielectrostrictive signals increase linearly with the shear stresses for all three types of chocolate. Thus, it indicates that the change in dielectric constant, $\Delta\varepsilon$, is proportional to stress, $\sigma$, for all types of chocolate. A positive intercept of the stress has been found for the chocolate with 60% cacao content, which indicates its viscoplastic behavior as reflected in the stress-shear rate curve in FIG. 5B. However, a small difference has been found between the yield stresses obtained by dielectrostriction method ($\sigma=1.35$ Pa) and rheological method ($\sigma=0.42$ Pa), which might be attributed to the measurement errors and/or the mismatch between two sensors caused during manufacturing.

A combination of Eqs. (24) and (25) yields the expression for the first stress-dielectric coefficient, $$|\lambda_1| = \frac{1}{\sigma_{yz}}\sqrt{2\varepsilon(\varepsilon+\varepsilon_s)(\Delta V_\perp - \Delta V_\|)/V^0}, \quad (27)$$

which indicates that the coefficient, $\lambda_1$, can be obtained by extracting signals from the perpendicular-to-flow and the parallel-to-flow sensors. For a viscoplastic material with a yield stress, $\sigma_y$, the shear stress, $\sigma_{yz}$, in Eq. (27) might be replaced by $\sigma_{yz}-\sigma_y$. To obtain the second stress-dielectric coefficient, $\lambda_2$, all stress components need to be known, which is not available with the current experimental setup.

Figure 9:
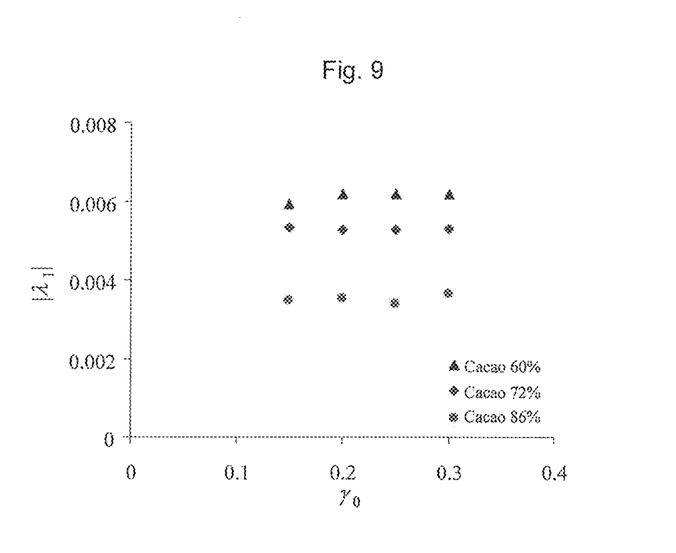
FIG. 9 shows the absolute value of stress-dielectric coefficients, $|\lambda_1|$, of three types of dark chocolate presented in terms of strain amplitude, $\gamma_0$.

The absolute value of the first stress-dielectric coefficient $|\lambda_1|$, in terms of strain amplitude, $\gamma_0$, is presented in FIG. 9. The values of first stress-dielectric coefficient were calculated based on the mean values of the dielectrostrictive signals presented in FIGS. 6 and 7. It has been found the coefficient, $\lambda_1$, varies little with strain for all three types of chocolate, which further supports that a linear relationship exists between the change in dielectric constant and stress in all types of chocolate, From FIGS. 5-9, it has been found that the differences in dielectrostrictive responses among three types of dark chocolate are much larger than the differences in their rheological responses. To provide a more direct comparison, the shear stresses, $\sigma$, at 30% strain amplitude, the first stress-dielectric coefficients, $|\lambda_1|$, and the extracted dielectrostritive signals from two mutually perpendicularly oriented sensors, $\Delta V_\perp - \Delta V_\|$, at 30% strain amplitude are listed in Table 2, along with the yield stresses, viscosities, and dielectric constants for the three types of dark chocolate.

TABLE 2

The comparison among rheological properties, dielectric constant and dielectrostrictive properties of three types of dark chocolate.

| | Rheological properties | | | Dielectric constant @10 kHz | Dielectrostrictive properties | |
|---|---|---|---|---|---|---|
| Cacao content (%) | Yield stress (Pa) | Viscosity (Pa·s) | Stress @ 30% strain (Pa) | | $|\lambda_1|$* @ 30% strain | $\Delta V_\square - \Delta V_\|$ @ 30% strain (mV) |
| 60% | 0.42 | 1.62 | 30.90 | 3.17 | 0.0061 | 2.07 |
| 72% | 0 | 1.61 | 30.35 | 3.37 | 0.0053 | 1.41 |
| 86% | 0 | 1.60 | 30.26 | 3.40 | 0.0035 | 0.66 |

*$|\lambda_1|$ herein is the average value of the first stress-dielectric coefficients obtained at different strain amplitudes of 15, 20, 25, and 30%.

From Table 2, one can see that while the maximum differences in viscosity and stress are less than 2%, and the maximum difference in dielectric constant are less than 8% among three types of chocolate, the first stress-dielectric coefficient of chocolate with 60% cacao content is about 1.15 times that of chocolate with 72% cacao content, and about 1.83 times that of chocolate with 86% cacao content. Moreover, according to the work function of the planar inter-digitated dielectrostrictive sensor, under shear deformation the sensor output signal is quadratic with the first stress-dielectric coefficient (see Eq. (24)). Therefore, the variation of dielectrostrictive signal is larger than that of the first stress-dielectric coefficient among the chocolate with different compositions. For instance, at a strain amplitude of 30%, the extracted dielectrostrictive signal from the parallel-to-flow and the perpendicular-to-flow sensors $\Delta V_\perp - \Delta V_\parallel$, of chocolate with 60% cacao content is about 1.47 times that of chocolate with 72% cacao content, and 3.14 times that of chocolate with 86% cacao content. The stress-dielectric coefficient and dielectrostrictive signal are more sensitive to material composition than viscosity, stress, and dielectric constant might be attributed to the fact that while viscosity and stress are only associated mechanical field, and dielectric constant is only associated with electrical field, both mechanical and electrical fields play important role in dielectrostriction effect.

EXAMPLE 2

Other potential applications include the measurement of the shear stresses experienced by the grease in bearing assemblies.

In this study, the dielectrostriction effect of grease was studied and its stress-dielectric relationship is determined in an oscillatory shear flow. The results revealed a linear relationship between the dielectric constant variation and stresses. A NLGI 2 grease containing paraffinic oil, mineral oil, and lithium soap was chosen for investigation. It has a dielectric constant of 2.67 at a frequency of 10 kHz, measured by an Agilent E4980A LCR meter.

An AR-2000 rheometer (TA Instruments) similar to that described above and shown in FIG. 5, was used to provide an oscillatory shear flow between two concentric cylinders and record the rheological responses. The excitation voltage was 7.07 V in amplitude and 10 kHz in frequency. When the signal is measured at double the frequency of the oscillation, as long as the normal stress contribution, $(\sigma_{xx}-\sigma_{yy})\Delta\varepsilon_{zz}\lambda_1$, is much less than the shear stress contribution, $\sigma_{yz}^2\lambda_1^2$, the normal stress contribution can be neglected.

During tests, the grease sample was placed into the gap between the two concentric cylinders of the rheometer and the measurements were conducted at 23° C. In the time sweep mode, the mechanical oscillation frequency was set to be 5 Hz, and the shear strain amplitude varied from 15% to 30% with an increment of 5% (the corresponding shear rate was from 4.71 s$^{-1}$ to 9.42 s$^{-1}$).

The voltage variations, $\Delta V_\perp$ and $\Delta V_\parallel$ from perpendicular-to-flow and parallel-to-flow sensors, were digitally recorded at 100 KHz sampling rate. The output signal was processed with a fast Fourier transform of the measured data. The strain and the corresponding shear stress were recorded by the rheometer simultaneously with the voltage outputs. Three samples of the grease were tested, each in triplicate.

Figure 10:
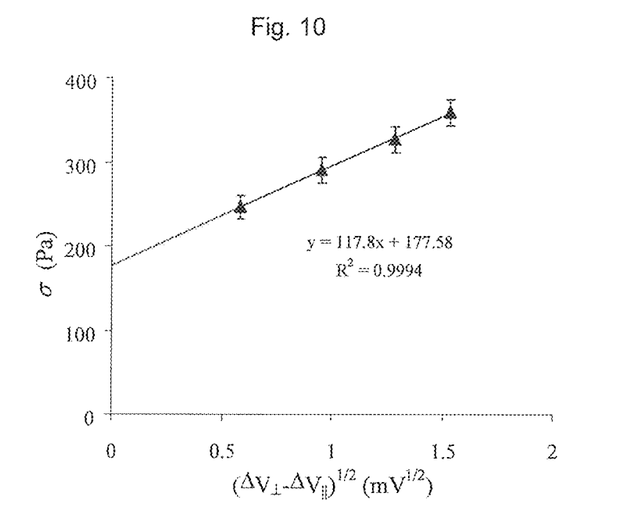
FIG. 10 shows the square root of the extracted signal, $\Delta V_\perp - \Delta V_\parallel$, from the parallel-to-flow and perpendicular-to-flow sensors vs. shear stress $\sigma$ for grease.

FIG. 10 presents the square root of the extracted signals from the parallel-to-flow and perpendicular-to-flow sensors in terms of the shear stress, $\sigma$, showing that the square root of the extracted dielectrostrictive signal increases linearly with the shear stress above a critical stress. Such a linear correlation indicates that above the critical stress, the change in the dielectric constant, $\Delta\varepsilon$, is proportional to the shear stress $\sigma$ in the grease. However, a difference was found between the intercepts of stress obtained by the dielectrostriction method (which was about $\sigma$=177 Pa) and the rheological method (which was about $\sigma$=137 Pa), which might be attributed to the measurement errors, the mismatch of two sensors due to fabrication inaccuracy, and/or the leaking current caused by the movement of the free charges in the grease upon the application of the excitation voltage.

FIG. 10 shows the square root of the extracted signal, $\Delta V_\perp - \Delta V_\parallel$, from the parallel-to-flow and perpendicular-to-flow sensors vs. shear stress $\sigma$ for grease.

The first stress-dielectric coefficient $\lambda_1$ can be obtained by extracting signals from the perpendicular-to-flow and the parallel-to-flow sensors. Acquisition of the second stress-dielectric coefficient, $\lambda_2$, requires the knowledge of all stress components, which is not available with the current experimental setup.

Figure 11:
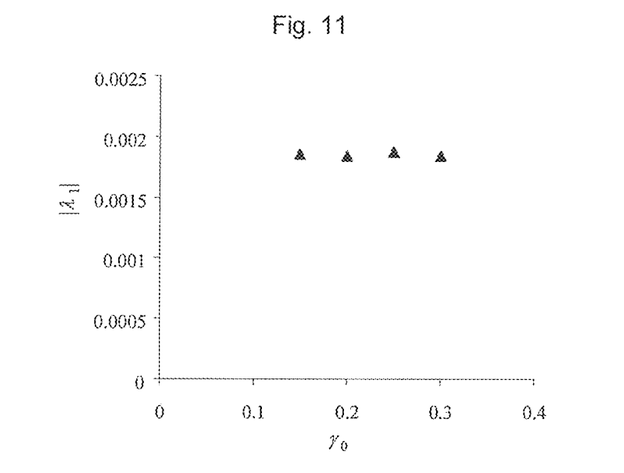
FIG. 11 shows the absolute value of the stress-dielectric coefficients, $|\lambda_1|$, of grease is presented in terms of strain amplitude $\gamma_0$.

FIG. 11 shows the absolute value of the stress-dielectric coefficients, $|\lambda_1|$, of grease is presented in terms of strain amplitude $\gamma_0$.

The absolute value of the first stress-dielectric coefficient, $|\lambda_1|$, in terms of the strain amplitude, $\gamma_0$, presented in FIG. 11, which is nearly independent of strain. It further supports the existence of a linear relationship between the change in dielectric constant, $\varepsilon$, and the shear stress, $\sigma$, in the grease.

Once the stress-dielectric coefficient, $\lambda_1$, of a grease is determined off-line with a rheometer using the dielectrostriction method, the output voltage signals from the on-line sensor rosette will report the shear stress information and monitor the condition of the grease flow. In an off-line measurement where both the direction and magnitude of shear stress are known, two differently oriented sensors are sufficient to obtain the first stress-dielectric coefficient. For on-line implementation of dielectrostriction method using the inter-digitated electrodes configuration, three differently oriented sensors would be required to obtain both the magnitude and direction of shear stress if the first stress-dielectric coefficient is known. A deviation from the pre-set stress-dielectric line might suggest grease degradation and composition variation.

it will be understood that the embodiments described above are illustrative of some of the applications of the principles of the present subject matter. Numerous modifications may be made by those skilled in the art without departing from the spirit and scope of the claimed subject matter, including those combinations of features that are individually disclosed or claimed herein. For these reasons, the scope hereof is not limited to the above description, but is set forth in the following claims,

The invention claimed is:

1. A sensor for measuring shear stress in a material having dielectric properties comprising:
   three adjacent dielectrostrictive sensors in a same polar coordinate quadrant, the quadrant having a common axial origin, each of the three adjacent dielectrostrictive sensors having a plurality of interdigitated electrodes arranged longitudinally in parallel to each other in a same orientation, each of the three adjacent dielectrostrictive sensors are separately deposited on a non-conductive substrate surface without overlap to form a generally planar rosette, wherein a parallel interdigitated electrode in each of the three adjacent dielectrostrictive sensors is radially aligned with a respective radius from a common axial origin, such that the three respective radii form three respective different known angles within the same quadrant.

2. The sensor of claim 1 further comprising:
   a voltage source electrically-connected to the electrodes for applying a voltage thereto; and
   a circuit for detecting a capacitance of the interdigitated electrodes in response to an applied voltage.

3. The sensor of claim 2 wherein the circuit detects a capacitance difference between any of two sensors.

4. The sensor of claim 2 wherein the circuit detects a variation in the capacitance of each sensor due to deformation or flow and calculates a difference in a capacitance variation of any two sensors.

5. The sensor of claim 1, wherein a combined length of all interdigitated electrode strips in each dielectrostrictive sensor is related to a capacitance of the dielectrostrictive sensor in free space.

6. A method for measuring a deformation of a viscoelastic substance having a known dielectric constant before deformation and known stress-dielectric coefficient comprising:
  providing a sensor for measuring shear stress in a material having dielectric properties comprising three adjacent dielectrostrictive sensors in a common polar coordinate quadrant, the quadrant having a common axial origin, each of the three adjacent dielectrostrictive sensors having a plurality of interdigitated electrodes arranged longitudinally parallel to each other in a same orientation, each of the three adjacent dielectrostrictive sensors are separately deposited on a non-conductive substrate surface without overlap to form a generally planar rosette, wherein a parallel interdigitated electrode in each of the three adjacent dielectrostrictive sensors is radially aligned with a respective radius from a common axial origin, such that the three respective radii form three respective different known angles within the same quadrant, the sensor being mounted on a surface of a structure so as to be subjected to flowing or deformed viscoelastic substance;
  applying a voltage to the three dielectrostrictive sensors;
  measuring a capacitance difference between any two of the three dielectrostrictive sensors, or a variation in the capacitance of each dielectrostrictive sensor due to deformation and calculates a difference in a capacitance variation of any two dielectrostrictive sensors; and
  correlating the capacitance difference to the dielectric constant of the substance under deformation or during flow to quantify a shear stress.

7. The method of claim 6 wherein the deformation characterize strain and/or stress.

8. The method of claim 7 wherein the stress comprises a normal component.

9. The method of claim 6, wherein a linear relationship exists between a change in the dielectric constant and the stress.

* * * * *